(12) United States Patent
Ridyard et al.

(10) Patent No.: US 12,276,766 B2
(45) Date of Patent: Apr. 15, 2025

(54) CONTINUOUS SEISMIC DATA ACQUISITION HAVING VARIABLE DENSITY SOURCE GEOMETRY

(71) Applicant: ACTeQ LLC, Katy, TX (US)

(72) Inventors: David Ridyard, Novato, CA (US); David J. Monk, Houston, TX (US); Damian Hite, Katy, TX (US)

(73) Assignee: ACTeQ LLC, Katy, TX (US)

( * ) Notice: Subject to any disclaimer, the term of this patent is extended or adjusted under 35 U.S.C. 154(b) by 413 days.

(21) Appl. No.: 17/827,075

(22) Filed: May 27, 2022

(65) Prior Publication Data

US 2023/0184979 A1 Jun. 15, 2023

Related U.S. Application Data

(60) Provisional application No. 63/288,730, filed on Dec. 13, 2021.

(51) Int. Cl.
| | | |
|---|---|---|
| *G01V 1/38* | (2006.01) | |
| *G01V 1/137* | (2006.01) | |
| *G01V 1/30* | (2006.01) | |

(52) U.S. Cl.
CPC ............ *G01V 1/3843* (2013.01); *G01V 1/137* (2013.01); *G01V 1/306* (2013.01); *G01V 1/3808* (2013.01); *G01V 2210/121* (2013.01); *G01V 2210/1423* (2013.01); *G01V 2210/1429* (2013.01)

(58) Field of Classification Search
CPC ...... G01V 1/3843; G01V 1/137; G01V 1/306; G01V 1/3808; G01V 2210/121; G01V 2210/1423; G01V 2210/1429
See application file for complete search history.

(56) References Cited

U.S. PATENT DOCUMENTS

| | | |
|---|---|---|
| 4,486,863 A | 12/1984 | French |
| 4,965,773 A | 10/1990 | Marschall |
| 5,838,284 A | 11/1998 | Dougherty |
| 6,044,040 A * | 3/2000 | Holland ................. G01V 1/003 181/111 |
| 6,678,207 B2 | 1/2004 | Duren |
| 9,703,000 B2 | 7/2017 | Moldoveanu et al. |
| 2011/0158048 A1 | 6/2011 | Guigne et al. |
| 2011/0188343 A1 | 8/2011 | Guigne et al. |
| 2014/0254315 A1* | 9/2014 | Rigsby ................. G01V 1/3852 367/15 |

(Continued)

*Primary Examiner* — Krystine E Breier
(74) *Attorney, Agent, or Firm* — Richard A. Fagin

(57) ABSTRACT

A method for seismic surveying comprises deploying a plurality of seismic receivers proximate an area of subsurface to be surveyed. At least one seismic energy source moves in a path that circumscribes a center, wherein positions of the plurality of seismic receivers remain fixed. At least one of a distance between the path and the center changes monotonically as seismic energy source traverses the path, or the center moves in a selected direction as the seismic energy source traverses the path. The source is actuated at selected times as the at least one seismic energy source traverses the path, such that a spacing between positions of the source along the source path and transverse to the source path varies between successive actuations of the source. Seismic energy is detected at the plurality of seismic receivers resulting from actuating the at least one seismic energy source.

20 Claims, 6 Drawing Sheets

(56) References Cited

U.S. PATENT DOCUMENTS

2020/0150299 A1\* 5/2020 Siliqi .................... G01V 1/143
2020/0333491 A1\* 10/2020 Bekara ................ G01V 1/3808
2022/0026595 A1\* 1/2022 Dellinger ................ G01V 1/36

\* cited by examiner

CONTINUOUS SEISMIC DATA ACQUISITION HAVING VARIABLE DENSITY SOURCE GEOMETRY

CROSS REFERENCE TO RELATED APPLICATIONS

Priority is claimed from U.S. Provisional Application No. 63/288,730 filed on Dec. 13, 2021 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of seismic data acquisition. More particularly, the disclosure relates to methods for arranging and moving seismic energy sources and arranging seismic receivers in order to increase survey acquisition efficiency.

Three-dimensional (3D) seismic surveys are used to produce images of formations below the Earth's surface or the bottom of a body of water for a number of different purposes. In oil and gas exploration and production, as well as geothermal, carbon capture, geotechnical and other applications, seismic survey images are used to estimate spatial distribution of formations and formation properties such as porosity, mineral composition and formation pore space fluid content.

Acquisition of a seismic survey comprises disposing one or more seismic energy sources at one or more locations on the surface, e.g., vibrators or similar sources, in shot holes below the surface, e.g., explosives, or air guns at shallow depth below the water surface in marine seismic surveys. In the case of marine surveys, the source or sources are typically towed behind a moving vessel in order to acquire seismic data over a large area of the sub-bottom in a reasonable amount of time. A plurality of seismic receivers may be towed by the same or a different vessel or deployed on the water bottom, or in land surveys disposed along and proximate to the ground surface.

Seismic energy is imparted into the subsurface at each or a plurality of source positions, called "shot points", and the resulting energy propagates through the subsurface where it is at least in part refracted and reflected. Some of the refracted and/or reflected energy returns to the receiver where it and is detected and recorded. The recorded signals can be processed to create subsurface images that are representative of the subsurface formation properties explained above.

In order to make efficient use of seismic data acquisition equipment, considerable effort is expended in suitable design of a survey. Design includes the geometric arrangement of the seismic energy sources and receivers, and how the sources and receivers are moved during the survey to extend the subsurface coverage area.

For example, a marine seismic data acquisition survey geometry may have sources arranged to move in the body of water along essentially straight lines (source lines). One or more seismic survey vessels (referred to as source vessels where only sources are towed) tow sources or source arrays, with the sources actuated at some predefined times or positions along the source lines. The receivers may be towed (streamers) by the same or a different vessel, or the receivers may be deployed in a fixed arrangement on the water bottom such as using ocean bottom cables or receiver nodes. In the former case, the lines are referred to as survey lines. The distance between successive actuations of the source(s) is known as the shot point interval. Once a given source line has been completed, the seismic survey vessel will turn to the start of the next source or survey line at some lateral separation from the completed line, and repeat the acquisition process along such next line.

The time for the seismic survey vessel (or source vessel) to travel from one line to the next line is known as the line change time. Line change time is considered to be non-productive time, and therefore is to be minimized.

In land based seismic surveying, multiple shot hole drilling crews and/or vibrator vehicles may be used to acquire multiple survey lines simultaneously. Similarly, in the marine environment multiple source vessels each having multiple source units may be used to acquire many simultaneous lines of data. Furthermore, in order to solve certain subsurface imaging problems, wherein the sampling requirements may vary over the area of the imaging project it may be beneficial to vary the line spacing and shot point interval in different areas of the survey.

Linear shooting patterns known in the art are inherently inefficient and spatial discontinuity in sampling can create artifacts in the final image. Most commonly, though not exclusively, sampling must be densest at the center of a survey, becoming sparser towards the outer edges. Linear shooting patterns typically lead to a constant distribution of data as a function of distance between source and receiver, which is inherently inefficient if the longer distances between source and receiver do not need to be sampled as often. Changing the distribution of data using linear shooting typically leads to an abrupt spatial discontinuity in sampling density, which can create artifacts in the final image.

French, U.S. Pat. No. 4,486,863, and Moldoveanu et al. U.S. Pat. No. 9,703,000 suggest that the inefficiencies associated with line changes can be largely eliminated, and good imaging can be obtained, if a vessel towing both sources and recording systems travel in a circular, spiral or cycloidal path. Spiral survey geometry is disclosed in Marschall, U.S. Pat. No. 4,965,773. A limitation to such methods as disclosed in the foregoing patents as they relate to marine seismic surveying is that they require towing streamers along such paths. It can be difficult in heavily obstructed areas, even along straight line survey paths to tow streamers. More recently, geophysical requirements for seismic surveys have created a need for the acquisition of data having separations between source and receiver that are greater than can be obtained using a single vessel towing both the sources and receivers. Thus even in a best case, multiple survey vessels may be required to perform such circular or spiral acquisition using streamers. Furthermore, where time lapse imaging of the subsurface is required, the positional uncertainty of the sources and receivers associated with ocean currents make it very difficult to obtain the required repeatability using towed streamer methods.

SUMMARY

One aspect of the present disclosure is a method for seismic surveying. A method according to this aspect comprises deploying a plurality of seismic receivers proximate an area of subsurface to be surveyed. At least one seismic energy source moves in a path that circumscribes a center, wherein positions of the plurality of seismic receivers remain fixed. At least one of a distance between the path and the center changes monotonically as seismic energy source traverses the path, or the center moves in a selected direction as the seismic energy source traverses the path. The source is actuated at selected times as the at least one seismic energy source traverses the path, such that a spacing between positions of the source along the source path and transverse to the source path varies between successive actuations of the source. Seismic energy is detected at the plurality of seismic receivers resulting from actuating the at least one seismic energy source.

Some embodiments further comprise moving a plurality of laterally spaced apart seismic energy sources along the path wherein at least one of the distance between the path and the center changes as the plurality of laterally spaced apart seismic energy sources traverse the path, and the center moves in a selected direction as the plurality of laterally spaced apart seismic energy sources traverse the path.

In some embodiments, a lateral spacing between the plurality of laterally spaced apart seismic energy sources remains substantially constant.

In some embodiments, a lateral spacing between the plurality of laterally spaced apart seismic energy sources varies with respect to the distance.

In some embodiments, the distance changes at a constant rate between successive traverses of the path by a selected reference azimuth.

In some embodiments, the distance changes at an increasing rate between successive traverses of the path by a selected reference azimuth.

In some embodiments, an average curvilinear distance between positions of the plurality of seismic energy sources upon successive actuations thereof is substantially constant.

In some embodiments, an average curvilinear distance between positions of the plurality of seismic energy sources upon successive actuations thereof increases corresponding with the distance.

In some embodiments, a curvilinear distance between positions of the plurality of seismic energy sources upon successive actuations varies randomly about the average curvilinear distance.

Other aspects and possible advantages will be apparent from the description and claims that follow.

DETAILED DESCRIPTION

Methods according to the present disclosure comprise arranging a plurality of seismic receivers in a selected pattern proximate an area of the subsurface to be surveyed. The seismic receivers may be disposed on the ground surface or in wellbores for land based surveys, or on the bottom of a body of water for marine surveys. The receivers may be connected to one or more cables (as ocean bottom cables in the case of marine surveys) or in individual or groups connected to separate recording modules (receiver nodes). One or more seismic energy sources may traverse a path that generally circumscribes a center. Various geometries for such path will be further explained below. Example embodiments of a method will be explained with reference to marine seismic surveys, however the scope of the present disclosure is not limited to marine seismic surveys. In particular, the various example embodiments are described with reference to a "source vessel path", wherein a seismic source vessel on the surface of a body of water tows one or more seismic sources along the source vessel path. It is to be clearly understood that a corresponding path may be traversed by any form of seismic energy source deployable on or proximate the land surface.

Figure 1:
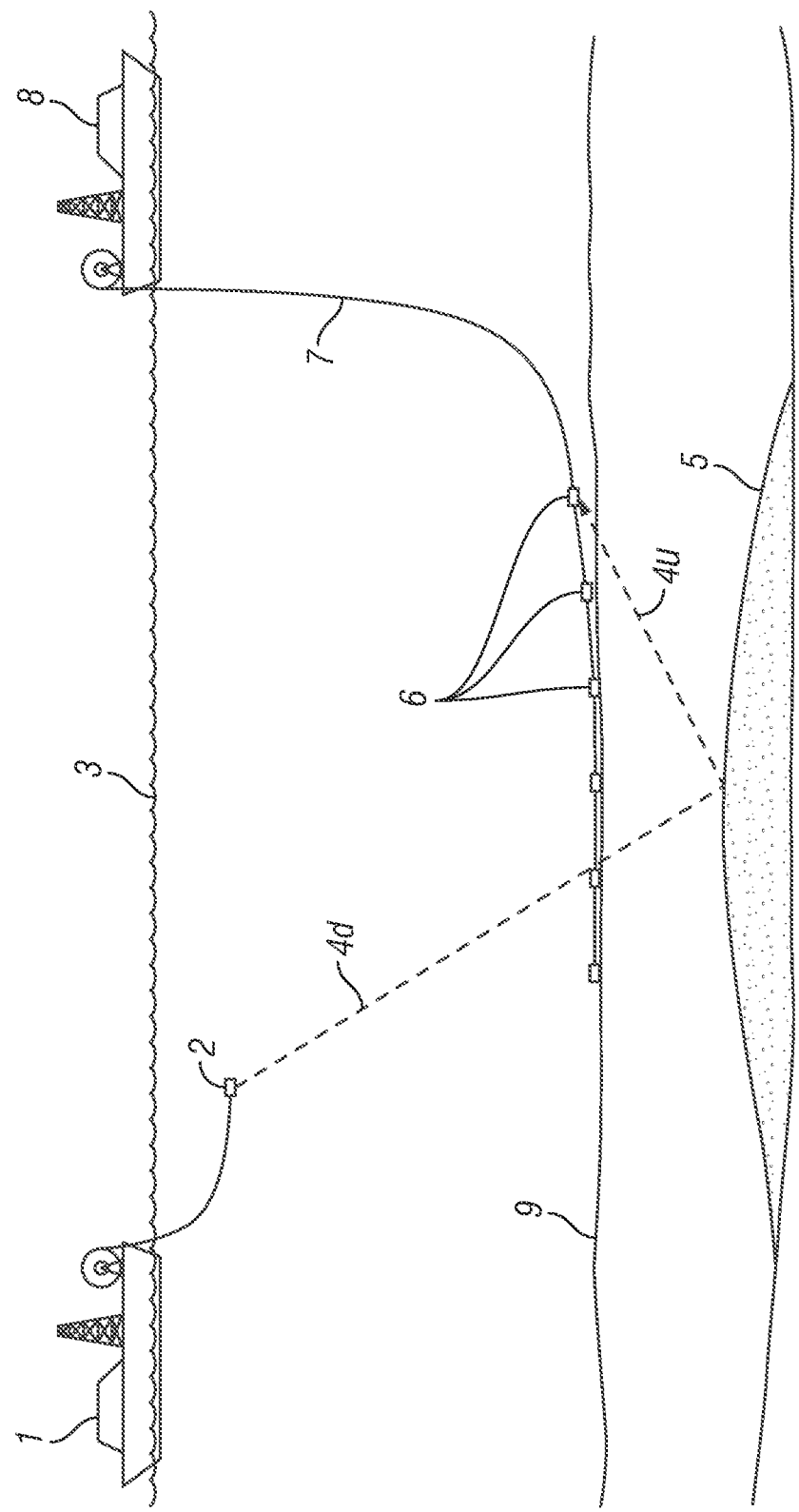
FIG. 1 illustrates a seismic source vessel towing a seismic energy source or source array and a receiver vessel deploying an ocean bottom cable receiver system on the bottom of a body of water.

FIG. 1 shows a simplified example of a typical marine seismic acquisition system, and acquisition of seismic survey data using such system that may be used in accordance with the present disclosure. A first ship or vessel, called a source vessel 1 tows a seismic source 2 or array of such sources at a selected distance below the surface 3 of a body of water such as the ocean. The seismic source 2 may be an impulsive source such as an air gun, or arrays of such guns, or one or more marine vibrators, collectively referred to herein as the "seismic source" 2. The seismic source 2 is actuated at selected times to produce a down-going wavefield 4d that is refracted and/or reflected into an up-going wavefield 4u by a subsea formation boundary 5 or subsea impedance change. The up-going wavefield 4u then travels toward seismic receivers 6 and is detected.

At each time the seismic source 2 is actuated, the geodetic position of the source vessel 1, and thus the geodetic position of the seismic source 2 is recorded using well known seismic data acquisition equipment. Each such geodetic location may be referred to herein for convenience as a "shot point." In methods according to the present disclosure, a direction of travel of the source vessel 1 may traverse a path that circumscribes a center in order to provide shot points in various advantageous patterns.

The seismic receivers 6 used in marine seismic acquisition according to the present disclosure may include pressure or pressure time derivative sensors, e.g., hydrophones, and/or particle motion sensors, e.g., accelerometers, geophones or velocity sensors. Typically, the pressure sensors are hydrophones and the particle motion sensors are geophones. The hydrophones measure a scalar pressure time gradient and are not sensitive to the propagation direction of the wavefield. The geophones, which may be vertical or three component geophones, provide for the vertical component geophone, a vector response measurement whose polarity depends on whether the direction of propagation of the wavefield is up-going or down-going. The amplitude of the geophone response is also related to an angle of the propagation relative to the sensitive direction of the geophone. If a wavefield is recorded by a hydrophone and a geophone with similar electronic impulse responses, then a polarity comparison between the hydrophone and geophone measurement determines whether the wavefield is propagating in the up-going or down-going direction. Hydrophones and geophones disposed at the seafloor are typically used in pairs when collecting seismic data. A combination of this two component or "dual sensor" data (pressure and particle motion) has been useful, among other purposes, to attenuate down-going multiple reflections from a combined pressure and vertical velocity data signal.

In seismic surveying according to the present disclosure, the seismic receivers 6 may be located at regular intervals in one or more ocean bottom cables (OBCs) 7 that are arranged on the water bottom 9. When necessary, a second ship or vessel 8 may be used to move the OBCs 7 to new positions on the water bottom 9. Several miles of OBCs 7 are typically deployed along the water bottom 9, and several OBCs are typically deployed in parallel arrangements. OBC arrangements are particularly well suited for use in certain zones (such as zones cluttered with platforms or where the water is very shallow) where the use of ship-towed receiver arrays (not shown) (which are located proximate the water surface 3 and are typically referred to as "streamers") is not practical.

The OBCs 7 may be arranged in any suitable pattern on the water bottom 9, while the source vessel 1 traverses one or more patterns to be described in more detail below. In the following description and associated figures of the drawings, possible shot points (seismic source actuation positions) will be indicated along the path traversed by the source vessel 1 with the symbol ○, and occasionally shown with reference numeral S. In the description of various example embodiments to follow, the seismic receiver positions are fixed, while the source positions (shot points) are moved along the indicated paths.

The OBCs 7 and thus the seismic receivers 6 may be arranged, for example, in one or more linear patterns on the water bottom, although more recently some randomization of the receiver pattern has become more common in order to facilitate data reconstruction using compressive sensing methods. The center of the source (shot point) pattern, which will be explained further below, may be close to the geometric center of the seismic receiver pattern(s). The source shot point pattern, referred to herein for convenience as a "source path" may extend to the edge of the receiver pattern and potentially several kilometers beyond.

Figure 2:
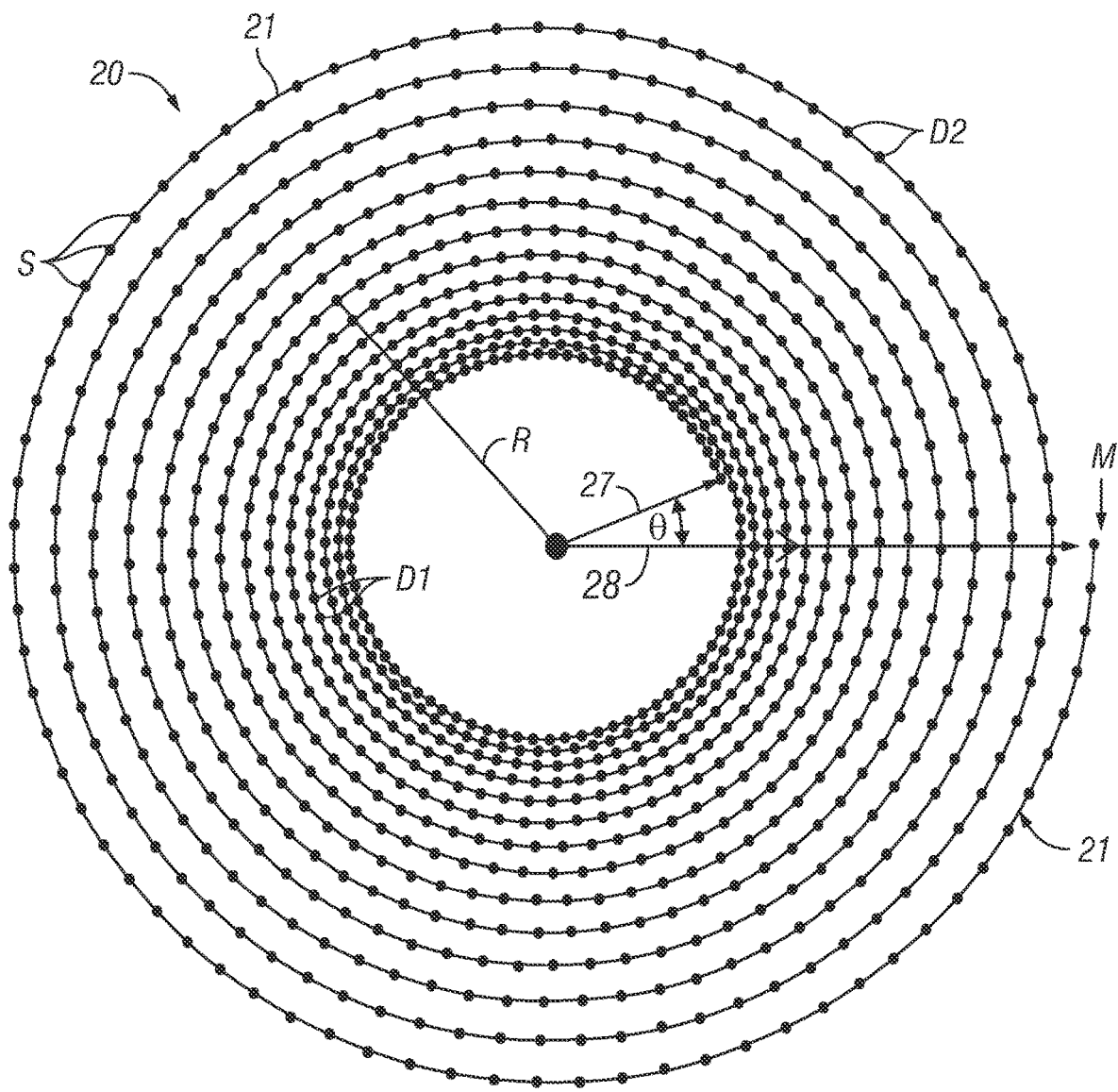
FIG. 2 is a plan schematic view of a spiral seismic data acquisition geometry, with a variable source line density along the spiral path.

FIG. 2 illustrates a plan schematic view of a spiral seismic source path 20. As explained above, the source vessel (1 in FIG. 1) traverses a path indicated by a spiral shaped line, called the source vessel path 21. Within the limits of navigation capability of equipment used to tow the seismic source(s), the seismic source(s) follow the source vessel path 21. The source vessel path 21 may define a center 26. The source vessel path 21 may begin at the center 26, or at any convenient initial radius 27 away from the center 26. Thus, starting the source vessel path 21 at a maximum initial radius and moving toward the center 26, and the opposite case, beginning at the center 26 and moving outwardly are within the scope of the present disclosure. The latter case is indicated by an example direction of motion M of the source vessel along the source vessel path 21 in FIG. 2. A reference azimuth 28 may define an arbitrary angular starting position of the source vessel path 21. The direction of motion M of the source vessel (1 in FIG. 1) is essentially perpendicular to the line (e.g., shown at 27 or 28) between the center 26 and the source vessel (1 in FIG. 1) position at any time. As the source vessel (1 in FIG. 1) moves along the source vessel part 21, the line connecting the source vessel position and the center 26 circumscribes the center 26. Thus, at any time, the connecting line defines an angle θ with respect to the reference azimuth 28.

In the present example embodiment, the distance between the source vessel path 21 and the center 26, shown as distance R, changes monotonically (increases or decreases depending on the direction of motion M) with respect to the angle θ. Such change in distance may, in an example embodiment, define a constant distance between successive passes of the source vessel path 21 through each particular angle θ. In some embodiments, the successive passes may have increasing distance between them with respect to each pass by the reference azimuth 28 or angle θ, or a decreasing distance between them with respect to each pass by the reference azimuth 28 or angle θ.

In the example embodiment shown in FIG. 2, a curvilinear distance D1 between successive shot points S may increase as the distance R increases, such as shown at D2. In other embodiments, the curvilinear distance D1 may decrease or may remain constant with respect to the distance R. The curvilinear distance D1 may be determined by selecting a time interval between successive actuations of the seismic energy source, which interval may be constant, may increase or may decrease.

In some embodiments, the inner portion of the source path 20, e.g., close to the center 26, may have the most dense occurrence of shot points S, either or both by decreasing the foregoing time interval toward the center 26, and decreasing the change in distance R between successive passes through any azimuth toward the center 26. In some embodiments, an individual seismic source may be actuated, for example, every 10-25 meters. Thus in some embodiments a vessel towing three sources (see FIGS. 6 and 7) may actuate one of such sources in the foregoing example every 3⅓ to 8⅓ meters. At the outer edge of the source path 20, the shot point spacing for any one source required for adequate spatial sampling may be much larger, e.g., on the order of 50-100 meters. Denser shot point spacing than, e.g., 100 meters may be used on the outer portions of the source path 20 because higher shot densities provide improved signal to noise ratio and any cost saving associated with increasing the shot point spacing beyond about 50 meters is relatively small. It is common practice to have locally uniform shot point spacing; more recently some randomization of shot point locations around an average or mean shot point spacing is becoming common in order to allow dense wavefield reconstruction using compressive sensing techniques. In methods according to the present disclosure, such average or mean shot point spacing is expressed as a curvilinear distance between adjacent shot points. Thus in some embodiments, the actual shot points may vary randomly about a mean or average curvilinear distance between successive shot points.

Figure 3:
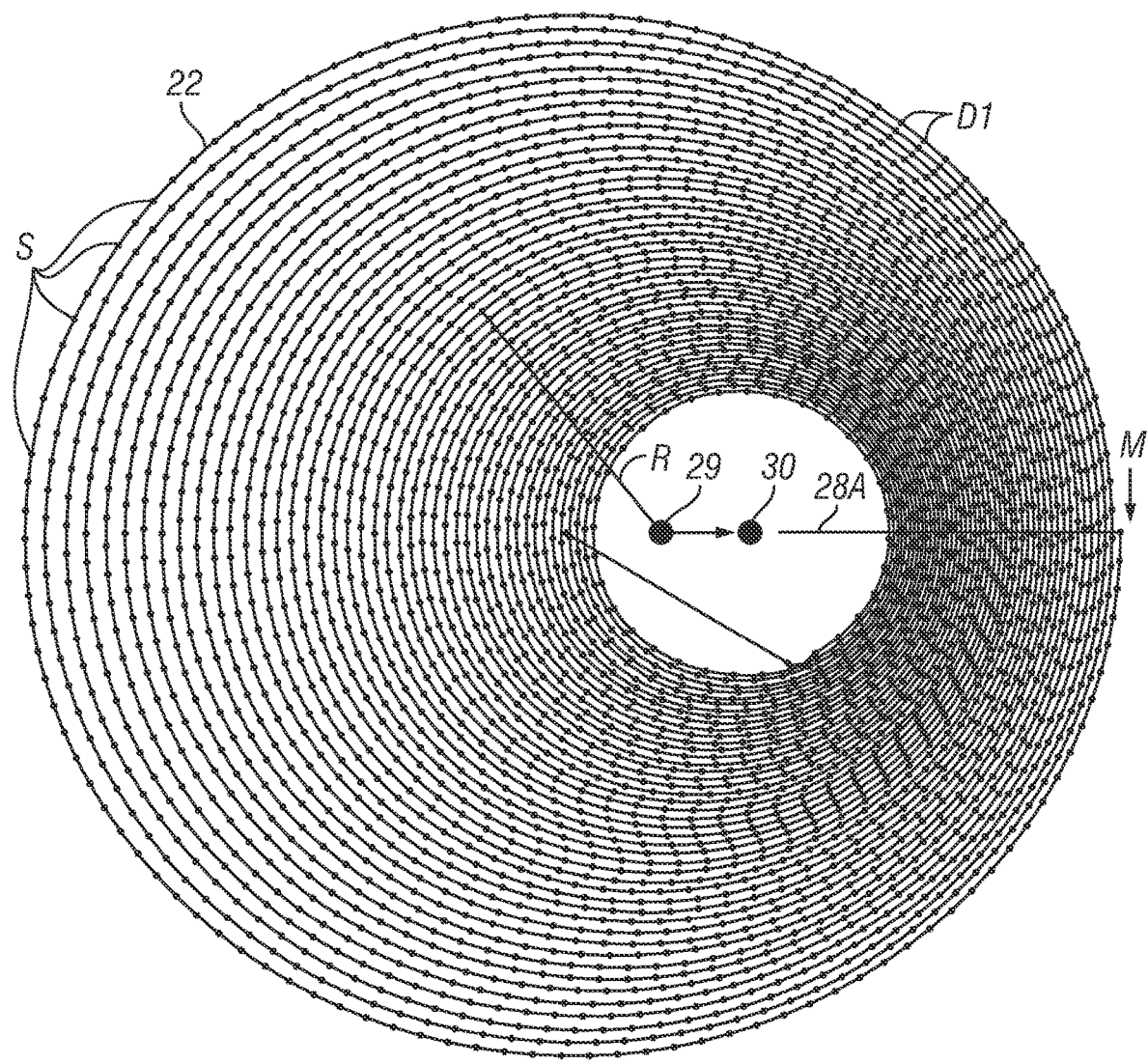
FIG. 3 is a plan schematic view of a spiral seismic data acquisition geometry, with a variable source line density along the spiral path, with a traveling center of rotation.

FIG. 3 illustrates a plan schematic view of a spiral source vessel path 22 having source path to center distance R and curvilinear distance D1 between shot points S as in the previous embodiment. In the embodiment of FIG. 3, the center 29 moves along a path defined by line 28A as the source vessel (1 in FIG. 1) traverses the source vessel path 22. Such motion results in an asymmetric spiral where the center is displaced from the initial center 29 to a final center 30.

Figure 4:
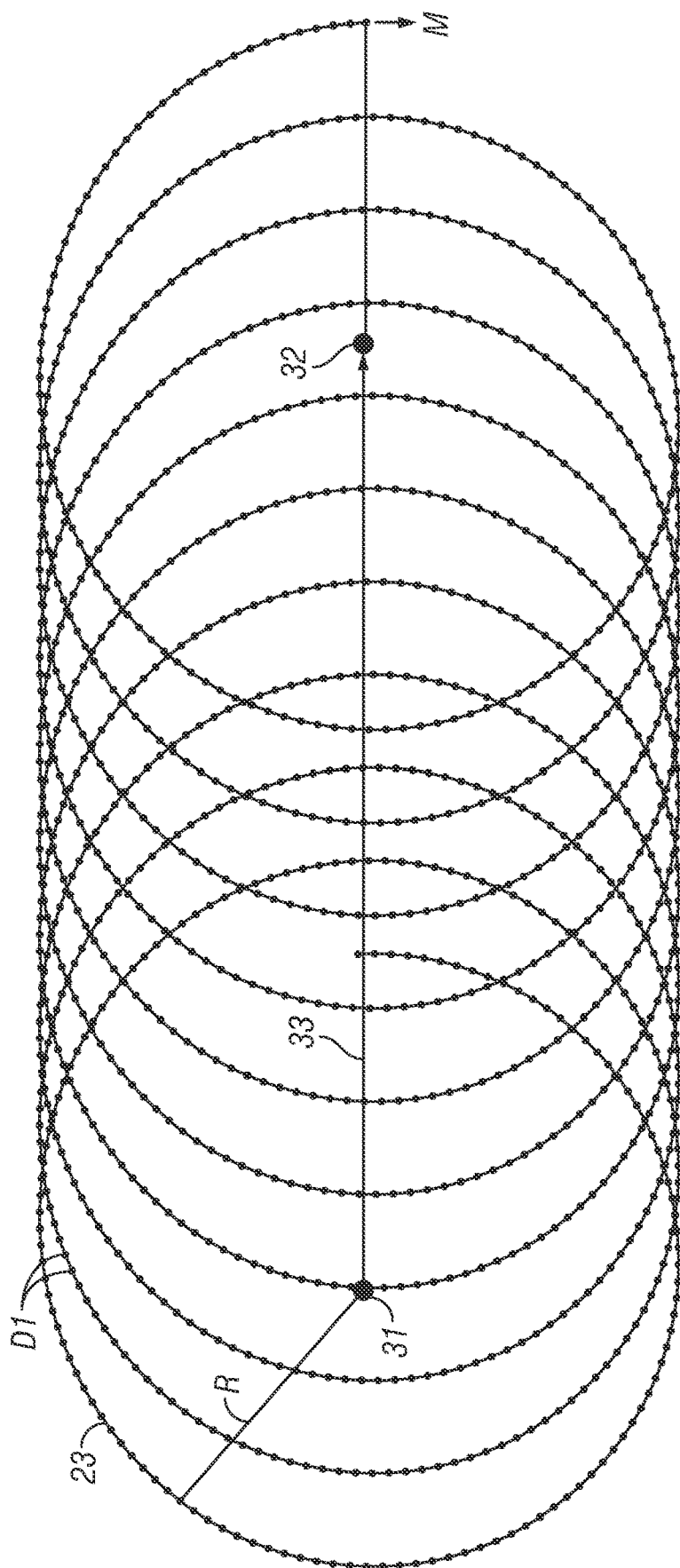
FIG. 4 is a plan schematic view of a spiral seismic data acquisition geometry, with a uniform source line density along the spiral path, with a traveling center of rotation.

FIG. 4 illustrates a plan schematic view of a cycloidal source vessel path, wherein the source vessel path 23 is maintained at a constant distance R from the center 31. In the embodiment of FIG. 4, the center 31 is moved along a line indicated by numeral 33 as the source vessel traverses the source vessel path 23, wherein the center 31 travels from its initial position to a final position indicated by numeral 33.

Figure 5:
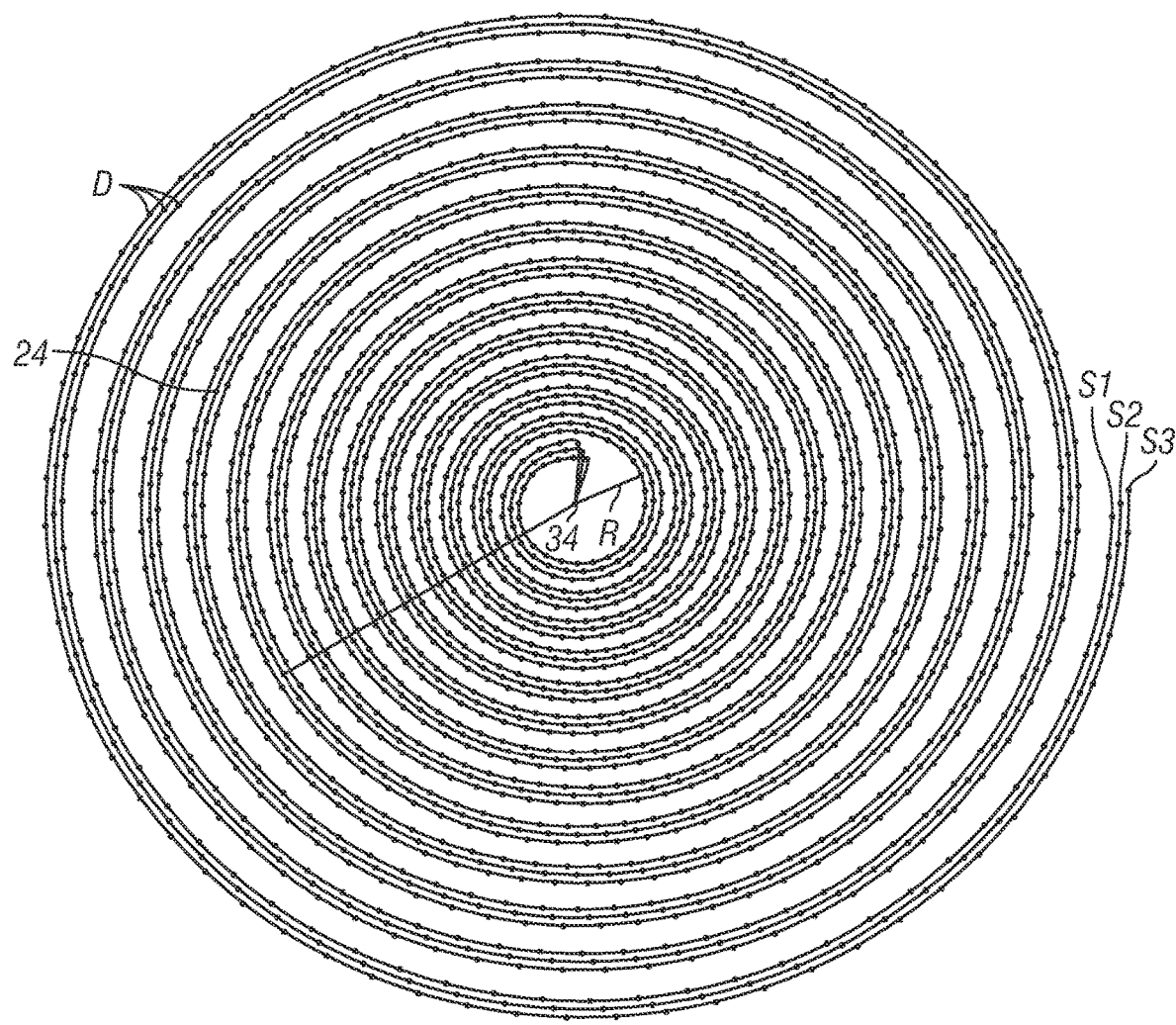
FIG. 5 is a plan schematic view of a spiral seismic data acquisition geometry, with a variable source line density along the spiral path, using three sources towed behind a vessel at a fixed lateral separation.

FIG. 5 illustrates a plan schematic view of another example embodiment of a spiral source vessel path 24 that may be used in connection with multiple seismic sources. In FIG. 5, the source vessel (1 in FIG. 1) may tow three, laterally spaced apart seismic sources or source arrays having a lateral spacing between adjacent sources or arrays indicated by reference numeral D. The distance R from the source vessel path 24 to the center 34 may be determined as explained with reference to any of the previous embodiments. In the present example embodiment, the curvilinear distance between successive shot points S1, S2, S3 (with reference to each of the sources) may be constant or may vary as explained with reference to any of the previous embodiments. In the present example embodiment, a lateral separation between the seismic sources, indicated by reference numeral D, may be maintained constant. In some embodiments, such distance D may increase or decrease along the source vessel path.

Figure 6:
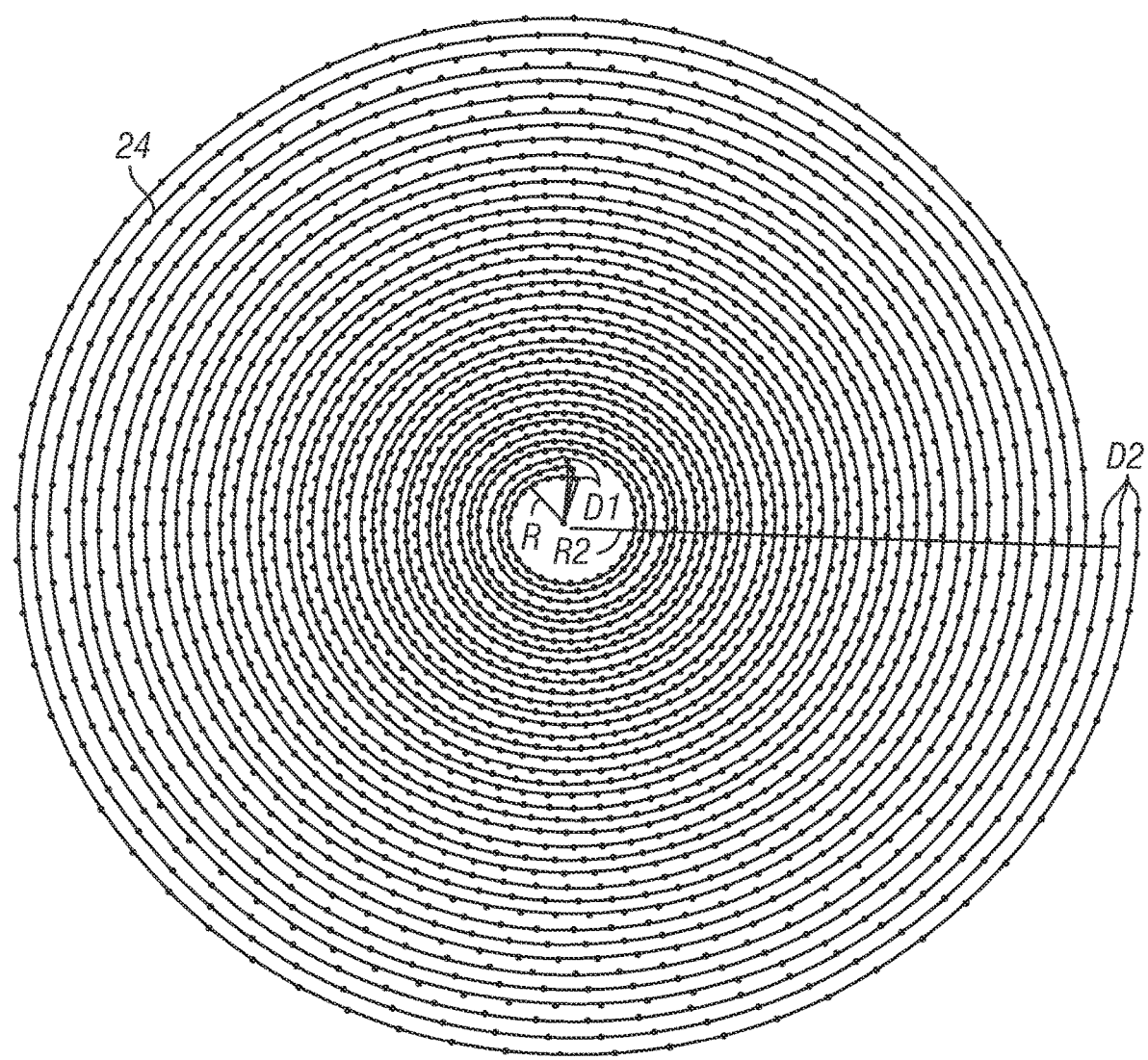
FIG. 6 is a plan schematic view of a spiral seismic data acquisition geometry, with a variable source line density along the spiral path, using three sources towed behind a vessel at a variable separation.

FIG. 6 illustrates an example embodiment which may have the same source vessel path 24 as the embodiment shown in FIG. 5, but in the present example embodiment, the lateral separation between the sources may monotonically increase from D1 to D2 as the distance increases from R1 to R2 in order to obtain a desired smooth variation in source path spacing R1, R2.

Increasing the adjacent source vessel path spacing reduces the total distance travelled by the source vessel(s) and thus the time and cost to acquire the survey. Increasing the shot spacing does not change the distance travelled but may still reduce time and cost.

The use of a variable shot spacing spiral seismic source path removes discontinuities in spatial sampling that are inherent in any pattern of straight line seismic source paths in which variable density is obtained through the abrupt termination of some subset of the lines.

In land based surveys, reducing the total number of source actuation (shots) results in direct time and cost saving. In a marine surveying using air guns, a source vessel having a finite compressor capacity, and thus a fixed source recharge time, will be able to travel faster along survey lines where the in-line source spacing is increased. The combination of increased source towing speed and increased line spacing can materially improve the productivity of a source vessel. In further examples, any of these parameters are held constant for some range of values of radius. This creates a geometry where, in one example, the spatial sampling is dense in one area, sparse in another area, with a smooth transition from one sampling density to the other.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A method for seismic surveying, comprising:
deploying a plurality of seismic receivers proximate an area of subsurface to be surveyed;
moving at least one seismic energy source in a path that circumscribes a center, wherein positions of the plurality of seismic receivers remain fixed;
wherein a distance between the path and the center changes continuously and monotonically as the at least one seismic energy source traverses the path;
actuating the at least one seismic energy source at selected times as the at least one seismic energy source traverses the path, wherein a spacing between positions of the at least one seismic energy source along the source path and transverse to the source path varies between successive actuations of the at least one seismic energy source; and
detecting seismic energy at the plurality of seismic receivers resulting from actuating the at least one seismic energy source.

2. The method of claim 1 wherein the distance changes at a constant rate between successive traverses of the path by a selected reference azimuth.

3. The method of claim 1 wherein the distance changes at an increasing rate between successive traverses of the path by a selected reference azimuth.

4. The method of claim 1 wherein an average curvilinear distance between positions of the at least one seismic energy source upon successive actuations thereof is substantially constant.

5. The method of claim 4 wherein a curvilinear distance between positions of the at least one seismic energy source varies randomly about the average curvilinear distance.

6. The method of claim 1 wherein an average curvilinear distance between positions of the at least one seismic energy source upon successive actuations thereof changes corresponding with the distance.

7. The method of claim 6 wherein a curvilinear distance between positions of the at least one seismic energy source varies randomly about the average curvilinear distance.

8. The method of claim 1 further comprising moving a plurality of laterally spaced apart seismic energy sources along the path wherein at least one of the distance between the path and the center increases as the plurality of laterally spaced apart seismic energy sources traverse the path, and the center moves in a selected direction as the plurality of laterally spaced apart seismic energy sources traverse the path.

9. The method of claim 8 wherein a lateral spacing between the plurality of laterally spaced apart seismic energy sources remains substantially constant.

10. The method of claim 8 wherein a lateral spacing between the plurality of laterally spaced apart seismic energy sources varies with respect to the distance.

11. The method of claim 8 wherein the distance increases at a constant rate between successive traverses of the path by a selected reference azimuth.

12. The method of claim 8 wherein the distance increases at an increasing rate between successive traverses of the path by a selected reference azimuth.

13. The method of claim 8 wherein an average curvilinear distance between positions of the plurality of seismic energy sources upon successive actuations thereof is substantially constant.

14. The method of claim 8 wherein an average curvilinear distance between positions of the plurality of seismic energy sources upon successive actuations thereof increases corresponding with the distance.

15. The method of claim 1 wherein the center moves in a selected direction as the at least one seismic energy source traverses the path.

16. A method for seismic surveying, comprising:
deploying a plurality of seismic receivers proximate an area of subsurface to be surveyed;
moving at least one seismic energy source in a path that circumscribes a center, wherein positions of the plurality of seismic receivers remain fixed;
wherein at least one of a distance between the path and the center changes monotonically as the at least one seismic energy source traverses the path, or the center moves in a selected direction as the at least one seismic energy source traverses the path;
actuating the at least one seismic energy source at selected times as the at least one seismic energy source traverses the path, wherein a spacing between positions of the at least one seismic energy source along the source path and transverse to the source path varies between successive actuations of the at least one seismic energy source
wherein an average curvilinear distance between positions of the at least one seismic energy source upon successive actuations thereof is substantially constant and the curvilinear distance between positions of the at least one seismic energy source varies randomly about the average curvilinear distance; and
detecting seismic energy at the plurality of seismic receivers resulting from actuating the at least one seismic energy source.

17. The method of claim 16 wherein when the distance between the path and the center changes, the distance between the path and the center changes at a constant rate between successive traverses of the path by a selected reference azimuth.

18. The method of claim 1 wherein when the distance between the path and the center changes, the distance between the path and the center changes at an increasing rate between successive traverses of the path by a selected reference azimuth.

19. The method of claim 16 wherein an average curvilinear distance between positions of the at least one seismic energy source upon successive actuations thereof changes corresponding with the distance between the path and the center when the distance between the path and the center changes.

20. The method of claim 19 wherein a curvilinear distance between positions of the at least one seismic energy source varies randomly about the average curvilinear distance.

* * * * *